# 2,777,771

EDIBLE POWDERS AND METHOD OF PRODUCING SAME

Robert Alexander Spencer Templeton, Gosmore, Hitchin, England

No Drawing. Application December 14, 1951, Serial No. 261,747

Claims priority, application Great Britain March 12, 1951

11 Claims. (Cl. 99—207)

The present invention relates to edible powders suitable for use in soups and for other food purposes, and to the method of producing the same.

Various methods have been proposed and practiced for many years by which vegetables and other substances have been made available in the form of dry powders suitable for reconstitution into soups.

One difficulty encountered in the production of such products is that if the dry powder is prepared from uncooked material, either in part or as a whole, it must, in order to have a cooked flavor, necessarily be subjected to a final cooking operation after reconstitution with the necessary liquid and before serving. For that reason a soup made from such a powder is not immediately ready for consumption on the addition of the liquid.

Another disadvantage is that the principal food substances from which the powders are made almost invariably contain a large proportion of water and, therefore, have been subjected to a large degree of drying, with the result that a significant quantity of the flavor factors, and possibly some of the nutritive factors, have been lost or impaired by the process of drying.

In order to overcome the first of these difficulties it is essential that the food substances shall first have been cooked before it is dried so that when the dried powder is reconstituted by the addition of liquid it shall need no further or final cooking in order to have a cooked flavor, and to be immediately available for consumption.

This requirement gives rise to a further difficulty in that the effect of cooking on most food substances and especially upon vegetables causes decided changes in the cellular structures of the food or vegetable, as well as in the nature and form of its content of water. Consequently, the food or vegetable being cooked, and therefore changed in the respects indicated, becomes much more difficult to dry into a powder without extensive damage to its structure and without impairment and loss of its flavor, and also, possibly, its nutritive values.

Various methods have been proposed by which cooked potatoes, as well as other starchy vegetables, may be reduced to a dry powder without significant damage to their structure, especially the sacs or envelopes in which the solids of the potato are substantially contained after cooking; and such dry potato powders are reconstitutable with hot water or milk, or with a mixture thereof, into mashed potato or potato soups which are immediately available for consumption without any further or final cooking step.

The extent to which such processes, which have been directed almost exclusively to the object of producing powder from cooked potatoes, can be applied to other food substances and other vegetables such as onions, carrots, beets, and the like, is not known, but it seems unlikely that such processes can have much applicability to such other non-starchy vegetables, since the structures of such other vegetables differ materially from the structure of the potato, and because of the much greater weight of water which must gradually be removed in drying such vegetables compared to that which must be removed from the potato.

I have found that improved results, and improved cooked, edible powders of vegetables and other food substances, suitable for use in soups and other food products, are obtained by starting with a starchy food product, of which the potato is here used as an example. The final dry powder, whether of a single vegetable or food substance, or a mixture thereof, is readily reconstituted merely by the addition of the desired liquid, and, when reconstituted, has the desired cooked flavor and aroma. Accordingly, the present invention relates to an improved cooked, edible food powder and method of producing the same in which the desired vegetable or other food substance, after being cooked, and preferably in a mashed or finely-divided state, and while still in the wet state, is added to cooked potato powder and the resultant mixture then dried.

I find, for instance, that if potatoes are cooked and reduced to a dry powder by one of the known methods, such as that described in the Rivoche Patent No. 2,520,891, in such a way that their cellular structure remains substantially intact, it is possible to make a cooked food powder, for example, a cooked tomato soup powder, by adding cooked tomatoes to the potato powder and then drying the resultant mixture to a powder. If the cooked food substances are added in gradual stages, a cooked food powder of any desired proportions as between potato and the other food substances can easily be obtained, even to the extent ultimately of a powder containing substantially 100% of the other cooked food substance. In such cases, the admixture of the other cooked food substance with the potato powder will take place either at intervals in the course of drying in the same machine, or separately. On the other hand, if only a small degree of cooked tomato flavor of the other food substance is desired, this can be achieved by a single addition of such other cooked vegetable substance to the potato powder, but if a full cooked flavor of the other food substance is desired several additions of the other cooked food substance, or a slow continuous addition thereof to the potato powder will be necessary.

I have found that when the cooked food powders are prepared in the manner set forth above, the loss of the flavor and aroma of the other cooked food substance in the course of evaporation is considerably arrested, if not entirely avoided. While not being desired to be limited to any particular theory, it appears that the action of the dry cells of the cooked potato bring into play a new advantageous principle in that immediately the other cooked wet food substance is brought into contact with them they attract into themselves and hold the semi-liquid substances of the other food product, which, in turn, contains the factors giving rise to the typical flavor and aroma of the other food substance. At any rate, it is clear that in the subsequent phase of evaporation of the mixture these flavor and aroma factors are held more tenaciously by the potato powder than they are by the other cooked food substance itself when evaporating the water therefrom by the standard straightforward means of making dry vegetable powders.

Another advantage is found in that the dry potato cells, if subjected to agitation or pressure, or both, at the time of or after the introduction of the other cooked food substance, have a considerable influence in penetrating and breaking down the rather slushy cooked flesh of the other food substance into a powdery substance which is more convenient for the subsequent process of drying.

It further has been found that if the other food substance is one having a pronounced skin, like the tomato, the penetrating and breaking down effect of the potato cells on the flesh of the other food substance assists in the separation of the skin from the flesh thereof, so that such skins are readily removed from the resultant powder in a subsequent operation. Therefore, the process is found to proceed perfectly satisfactorily without the necessity for peeling the cooked additive substance.

The cooked additive substance may be broken down by any form of disintegration, or pressure, if desired, for example, by a mashing or mincing action of any standard type before the product is added to the cooked dry potato powder.

The invention can be used alternatively to produce a cooked dry powder containing several cooked vegetables or other cooked food substances, thus producing a composite cooked dry powder, and where this is done it is found again that the strength of the aroma and flavor, as well as the delicateness of the blending of the various flavors is significantly enhanced by the principle of absorption, by the reduced rate of evaporation, and by the continual and progressive intimate association which are particular features of this invention.

It is possible without destroying the general character of a product of the invention as a cooked soup or puree powder immediately available upon reconstitution with liquid, to add to the dry potato powder, or to the mixture of the potato powder and the cooked food substance, uncooked food or vegetable substances, either in wet or dry form, if a particular natural flavor and aroma are specially desired. If the uncooked food or vegetable substance is added in wet form, it should be added before the final drying of the mixture of potato powder and additive cooked substance. However, when uncooked food substances are added, it is necessary that the final product shall remain substantially a cooked food or vegetable powder. Therefore, the additional uncooked food or vegetable substances should not exceed more than 30% of the whole of the weight of the final dry powder.

In drying the mixture of potato powder and the other cooked food substance, care should be taken to ensure that the temperature thereof does not rise above 50° C., and if any part or the whole of the food substance contains a percentage of fat, as in the case of meat, the temperature thereof must be kept reasonably below the melting point of that fat.

The amount of the cooked food or vegetable substance which may be added to the dried starchy food powder, and, consequently, the amount in the resultant final powder, is not critical and may vary according to individual requirements, such as the particular use to which it is to be put and the flavor desired in the reconstituted product. Therefore, the amount may be such as will give only a slight flavor in the reconstituted product, or by successive additions of the other cooked food substance, or by the continuous addition of the other cooked food substance, a final powder may be obtained which is substantially 100% of such other food substance.

During the preparation of the edible powder, the amount of the other cooked food substance which is added should not be such as to increase the moisture of the resulting mixture substantially above 50% at any time. When the moisture content of the mixture does not substantially exceed 50%, the mixture will be in the form of a crumbly, damp powder which can be dried within an externally-heated cylindrical drier. Should the moisture content of the mixture exceed that amount, it will form a sticky, pasty mass which will ball up if an attempt is made to dry it within an externally-heated cylindrical drier, and resort then would have to be made to drying the mixture as a film on the exterior of an internally-heated drum drier. Such a method of drying is not satisfactory for such food products, since it is too harsh a treatment to maintain the proper texture and flavor which is necessary in food products.

The present invention is useful for making edible food powders from fruits, meats and vegetables, such as celery, onions, beets, carrots, parsnips, swede, tomatoes, peas, cabbage, spinach, etc. The resulting powders are immediately available and are readily reconstituted merely by the addition of hot water or milk, or both.

The invention will be further described in connection with the following examples:

*Example I*

To 100 lbs. of potato powder having a water content of 8% was added 80 lbs. of finely-divided cooked tomatoes having a water content of 90%. The potato powder and the tomatoes were thoroughly mixed and subjected to drying in a conventional steam-jacketed cylinder drier having internal means for agitating the resultant mixture. The temperature of the steam was so regulated that the temperature of the mixture undergoing drying was never permitted to rise to above 50° C. The drying was continued until the moisture content of the mixture of potato powder and cooked tomatoes had been reduced to 20 lbs., i. e., to a moisture content of about 17%.

To the dry powder from the above-drying operation, containing 92 lbs. of potato powder and 8 lbs. of tomato powder, 100 lbs. of the cooked tomatoes were added, thoroughly mixed and dried in the same manner until a powder again containing about 17% of moisture was obtained.

The above procedure of adding cooked tomatoes to the dry powder of the prior drying operation was continued, never letting the resulting mixture to be dried have a moisture content exceeding about 50%, until the final powder contained 98 lbs. of tomato and 2 lbs. of potato on the dry basis. The final drying operation was continued until the moisture content was reduced to 8%. The weight of the final dry powder was approximately 4600 lbs. The skins of the tomatoes were removed by a final sieving operation.

*Example II*

In this example the operation was the same as in Example I, except that the addition of cooked tomatoes was discontinued when the dry powder had attained a tomato content of 70% on a dry basis; the final drying operation again being continued until the moisture content had been reduced to 8%.

While a moisture content of about 8% normally is preferred, the drying may be continued until a moisture content of only 4 or 5% is obtained. The moisture content of the final dry powder should be below about 15% to avoid possible spoilage of the powder on storage.

Instead of adding the cooked tomatoes in batches followed with subsequent drying of the resultant mixture, the operation may be carried out as continuous one with the cooked tomatoes being continuously added to the drying cylinder during the drying operation, but at such rates that the mixture undergoing drying never exceeds a moisture content of about 50%.

*Example III*

This example was carried out the same as in Example II, except that 10 lbs. of finely-divided cooked onions, 90% moisture content, were added to the mixture of potatoes and tomatoes prior to the final drying operation, in order to impart an onion flavor to the final dry powder.

*Example IV*

This example was the same as Example III, except that instead of adding cooked onions prior to the final drying operation, 25 lbs. of finely-divided cooked celery, 92% moisture, were added to the potato-tomato mix, to impart a celery flavor to the final product.

Instead of adding the celery or onions just prior to the final drying operation, they may, if desired, be added at any time after the mixture has attained a high tomato concentration, for example, a concentration of about 60%.

*Examples V and VI*

These examples were the same as Examples III and IV, respectively, except that 1% of raw, previously dried and finely-divided onions, and 2.5% of raw, previously dried and finely-divided celery, respectively, were added to the potato-tomato mix.

While cooked tomatoes were used in each of the above examples, it will be understood that the method of procedure with respect to other vegetables would be the same.

Instead of preparing an edible powder containing substantially a single food substance other than potato, or an edible powder containing potato and mainly only one other food substance, edible powders may be prepared which contain quite a number of different vegetables or food substances. For example, a powder may be prepared containing all the vegetables which normally would be used in making vegetable soup.

Edible powders of fruits may be prepared in the same manner as described in the preceding examples. Thus, an apple powder may be prepared for use in the making of apple sauce. Likewise, powders containing extracts of meat, or powdered meat itself, may be prepared. But when finely-minced meat itself is added, care should be taken during the drying operation to ensure that the temperature of the mixture undergoing drying is maintained well below the melting point of the fat thereof.

It will be understood that salt, hydrolyzed proteins, mono-sodium glutinate, or other seasonings may be added at any stage during the preparation of the final dry powder.

It has been found that as mixtures of potato powder and other food substances which have a pronounced skin, like the tomato and apple, are being agitated in the drier, the skins of such other food substances form as a layer on top of the mixture, enabling most of them to be removed by suction, or otherwise, before the final powder is obtained, if desired.

After the final drying of the product, it may be subjected to a suitable milling operation to form it into a powder of the desired fineness. For most purposes the final dry product will be milled until all of it passes a 60-mesh screen, approximately 20% will be retained on an 80-mesh screen, and approximately 50% will be retained on a 100-mesh screen, with the remaining approximately 30% of a size to pass the 100-mesh screen.

The edible powder of the invention has many uses as food products and as constituents of food products, where a cooked food product instantly reconstitutable merely by the addition of a liquid, such as water or milk is desired. It is particularly desirable for the preparation of cream soups, purees, and infant and baby foods.

While for special uses the final product may consist almost entirely of a food substance other than the potato, normally it will contain at least 10% and preferably 15 or 20% of potato. When the edible powder is to be used for preparing creamed soups, a potato content of approximately 22% is desirable in order to impart the desired smoothness to the soup.

It is to be understood that various changes may be made in the details of the procedure of preparing the edible powders of the invention without sacrificing any of the advantages thereof or departing from the scope of the appended claims.

I claim:

1. The method of preparing edible products which comprises adding to a powder of a cooked starchy vegetable substance a different vegetable substance in wet form in such amount that the moisture content of the resultant mixture never substantially exceeds 50%, mixing the powder with the different vegetable substance, and drying the last-named mixture under conditions such that the temperature thereof is maintained below about 50° C.

2. The method of preparing edible products as defined in claim 1 in which the different vegetable substance is cooked prior to being admixed with the powder.

3. The method of preparing edible products as defined in claim 2 in which a third vegetable substance in a raw state is also added to the food powder in amount such that it does not form more than 30% of the final dry product.

4. The method of preparing edible products as defined in claim 1 in which said different vegetable substance is reduced to a state of fine division before it is added to the powder.

5. The method of preparing edible products as defined in claim 1 in which said different vegetable substance is reduced to a finely-divided state prior to the final drying operation.

6. The method of preparing edible products as defined in claim 1 in which the starchy vegetable substance is potato.

7. The method of preparing edible products as defined in claim 1 in which the different vegetable substance is tomato.

8. The method of preparing edible products as defined in claim 1 in which the drying is continued until the resultant mixture has a water content of less than about 15%.

9. The method of preparing edible powder which comprises adding to a powder of a cooked starchy vegetable substance a portion of a different vegetable substance in finely-divided, wet form, mixing the powder with the different vegetable substance, at least partially drying the resulting mixture, thereafter adding to the product of the drying operation another portion of said different vegetable substance in finely-divided, wet form, mixing the resulting mass, at least partially drying the resulting mass, and continuing such additions of said different vegetable substance and subsequent mixing and drying in like manner, as may be necessary, to obtain a final dry powder containing the desired proportion of said other food substance, the amount of said different vegetable substance added in any stage being such that the moisture content of the resultant mixture never exceeds about 50% and the drying is carried out under conditions such that the temperature of the mixture never exceeds about 50° C.

10. The method of preparing edible powder which comprises adding to a powder of a cooked starchy vegetable substance a different vegetable substance in finely-divided, wet form, mixing the powder with the other food substance, drying the resultant mixture, and during such drying adding further amounts of said other food substance in finely-divided, wet form, the amount of said different vegetable substance initially added and added during the drying being such that the moisture content of the resulting mixture never exceeds about 50% and the drying is carried out under conditions such that the temperature of the mixture never exceeds about 50° C.

11. A food product resulting from the method of claim 1.

References Cited in the file of this patent

UNITED STATES PATENTS

| | | |
|---|---|---|
| 625,880 | Gere | May 30, 1899 |
| 1,204,845 | Brune | Nov. 14, 1916 |
| 1,609,720 | Humphrey | Dec. 7, 1926 |
| 2,352,670 | Volpertas | July 4, 1944 |
| 2,355,394 | Ross | Aug. 8, 1944 |
| 2,381,838 | Rendle | Aug. 7, 1945 |
| 2,451,313 | Jones | Oct. 12, 1948 |
| 2,520,891 | Rivoche | Aug. 29, 1950 |
| 2,665,208 | Spieser | Jan. 5, 1954 |

FOREIGN PATENTS

| | | |
|---|---|---|
| 525,043 | Great Britain | Aug. 20, 1940 |